United States Patent
Kim et al.

(10) Patent No.: US 11,330,219 B2
(45) Date of Patent: May 10, 2022

(54) DYNAMIC VISION SENSOR SYSTEM

(71) Applicant: SAMSUNG ELECTRONICS CO., LTD., Suwon-si (KR)

(72) Inventors: Byoungmoo Kim, Suwon-si (KR); Jaeho Baek, Suwon-si (KR); Jongwoo Bong, Seoul (KR); JOngseok Seo, Seoul (KR); Donghee Yeo, Seoul (KR); Seungnam Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 16/943,392

(22) Filed: Jul. 30, 2020

(65) Prior Publication Data

US 2021/0185258 A1   Jun. 17, 2021

(30) Foreign Application Priority Data

Dec. 17, 2019   (KR) .................. 10-2019-0168801

(51) Int. Cl.
  *H04N 5/378* (2011.01)
  *H04N 5/351* (2011.01)
  *H04N 5/376* (2011.01)

(52) U.S. Cl.
  CPC ............. *H04N 5/378* (2013.01); *H04N 5/351* (2013.01); *H04N 5/3765* (2013.01)

(58) Field of Classification Search
  CPC ...... H04N 5/378; H04N 5/351; H04N 5/3765; H04N 5/341; H04N 5/379
  See application file for complete search history.

(56) References Cited

U.S. PATENT DOCUMENTS

| | | | |
|---|---|---|---|
| 6,656,751 B2 | 12/2003 | Andersen et al. | |
| 6,797,933 B1 | 9/2004 | Mendis et al. | |
| 8,036,273 B2 | 10/2011 | Karczewicz et al. | |
| 9,520,426 B2 * | 12/2016 | Kim ...................... | H04N 5/378 |

(Continued)

FOREIGN PATENT DOCUMENTS

KR   10-2016-0038693   4/2016

OTHER PUBLICATIONS

Bongki, et al., "A 640×480 Dynamic Vision Sensor with a 9μm Pixel and 300Meps Address-Event Representation", ISSCC 2017, Session 4, Imagers, 4.1, 3 pages.

*Primary Examiner* — Nhan T Tran
(74) *Attorney, Agent, or Firm* — F. Chau & Associates, LLC

(57) ABSTRACT

The present disclosure relates to a dynamic vision sensor. The dynamic vision sensor comprises a pixel array, address event representations, and a control logic. The pixel array includes a plurality of dynamic vision sensor (DVS) pixels connected to a plurality of row lines and a plurality of column lines. Each of the DVS pixels is configured to output an event signal in response to a change in light. The address event representations are configured to select one of the plurality of column lines and obtain an event signal output from DVS pixels connected to the selected column line. The control logic is configured to generate image data, including an object capable of generating a movement using an event signal output from each of the plurality of DVS pixels. The control logic divides the plurality of DVS pixels into a plurality of groups and allocates different readout times to each of the plurality of groups.

20 Claims, 12 Drawing Sheets

(56) References Cited

U.S. PATENT DOCUMENTS

| | | | |
|---|---|---|---|
| 9,880,048 B2 | 1/2018 | Martin et al. | |
| 10,302,420 B2 | 5/2019 | Brandli et al. | |
| 10,345,447 B1* | 7/2019 | Hicks | G01S 7/486 |
| 2016/0078001 A1 | 3/2016 | Wang et al. | |
| 2016/0093273 A1* | 3/2016 | Wang | G01S 3/781 |
| | | | 345/428 |
| 2018/0189959 A1* | 7/2018 | Berner | H04N 5/37455 |
| 2018/0295298 A1* | 10/2018 | Zamir | H04N 5/3745 |
| 2020/0058205 A1* | 2/2020 | Yaffe | G08B 13/1961 |
| 2020/0396409 A1* | 12/2020 | Posch | H04N 5/376 |
| 2021/0279890 A1* | 9/2021 | Mou | G06T 7/215 |
| 2021/0344854 A1* | 11/2021 | Bock | H04N 5/351 |

\* cited by examiner

DYNAMIC VISION SENSOR SYSTEM

CROSS-REFERENCE TO RELATED APPLICATION(S)

This application claims benefit of priority to Korean Patent Application No. 10-2019-0168801 filed on Dec. 17, 2019 in the Korean Intellectual Property Office, the disclosure of which is incorporated by reference herein in its entirety.

BACKGROUND

1. Field

The present inventive concept relates to a dynamic vision sensor system.

2. Description of Related Art

A sensor is a device used to detect changes or events and send the information to other electronic components, such as calculation components. A vision sensor is a sensor that uses images from a camera system to determine a part in 3D space. For example, a 3D scanning device can locate and record an item in space for post processing in a computer aided design (CAD) software.

A dynamic vision sensor (DVS) is an image sensing device that can detect changes in an image. Unlike conventional cameras, a DVS is event based. That is, an image is not captured with a shutter, but based on movement or changes in brightness of a subject. The DVS includes a pixel array in which each pixel independently and individually calculates a relative change in light. Each pixel outputs an event signal when the change in light exceeds a threshold. Therefore, a DVS can process image data quickly.

However, in some cases, the frame rate of a conventional DVS device may be insufficient. Therefore, there is a need in the art to increase the frame rate of a DVS device.

SUMMARY

An aspect of the present inventive concept is to provide a DVS system capable of increasing a frame rate.

According to an aspect of the present inventive concept, a dynamic vision sensor system includes: a pixel array connected to a plurality of row lines and a plurality of column lines, the pixel array including a plurality of dynamic vision sensor (DVS) pixels, each of the plurality of DVS pixels being configured to output an event signal in response to a change in light; address event representations configured to select one of the plurality of column lines, and to obtain an event signal output from DVS pixels connected to the selected column line; and a control logic configured to generate image data, including an object capable of moving using an event signal output from each of the plurality of DVS pixels. The control logic divides the plurality of DVS pixels into a plurality of groups and allocates different readout times to each of the plurality of groups.

According to an aspect of the present inventive concept, a dynamic vision sensor system includes: a pixel array including a plurality of dynamic vision sensor (DVS) pixels connected to a plurality of row lines and a plurality of column lines, and each of the plurality of DVS pixels being configured to output an event signal in response to a change in light; address event representations configured to determine one of the plurality of column lines as a selection column line, and to obtain an event signal output from selection DVS pixels connected to the selection column line; and a control logic configured to control the address event representations, and to receive the event signal from the address event representations. The control logic determines a readout time of the selection DVS pixels based on a time required for the address event representations to obtain the event signal.

According to an aspect of the present inventive concept, a dynamic vision sensor system includes: a pixel array including DVS pixels connected to a plurality of row lines and a plurality of column lines, and o each of the DVS pixels being configured to output an event signal in response to a change in light, the DVS pixels being divided into a first group and a second group; address event representations configured to select one of the plurality of column lines and to obtain the event signal output from DVS pixels connected to the selected column line; and a control logic configured to control the address event representations and to determine an event corresponding to the event signal by using the event signal. The first readout time of the first group is determined according to a position of the first group in the pixel array, and the second readout time of the second group is determined according to a position of the second group in the pixel array. The first read out time and the second read out time are different from each other.

According to an aspect of the present inventive concept, a method of operating a dynamic vision sensor is described, the method comprising performing a first readout of a first group of DVS pixels based on a first readout time; performing a second readout of a second group of DVS pixels based on a second readout time having a shorter duration than the first readout time; identifying event signals indicating a change in light conditions based on the first readout and the second readout; and generating image data based on the event signals. In some cases, the first readout time is determined based on a first distance between at least one of the first group of DVS pixels and one or more address event representations, and the second readout time is determined based on a second distance between at least one of the second group of DVS pixels and the address event representations, the second distance being smaller than the first distance.

BRIEF DESCRIPTION OF DRAWINGS

The above and other aspects, features and other advantages of the present disclosure will be more clearly understood from the following detailed description, taken in conjunction with the accompanying drawings, in which.

DETAILED DESCRIPTION

The present disclosure relates to a dynamic vision sensor (DVS). More specifically, certain embodiments relate to a DVS with increased frame rate capabilities. In some cases, the readout times of the DVS pixels in a pixel array may be the same as each other. For example, the readout times of remaining DVS pixels may be set based on the readout time of pixels located at a maximum physical distance. However, when the same readout time is allocated to all of the DVS pixels, the frame rate may be reduced.

Thus, embodiments of the present disclosure present a plurality of DVS pixels divided into different groups based on position. Different readout times may be allocated to the different groups. Since an optimized readout time may be allocated to each group, the frame rate can be increased.

According to some embodiments of the present disclosure, a DVS comprises a pixel array, address event representations, and a control logic. The pixel array includes a plurality of DVS pixels connected to a plurality of row lines and a plurality of column lines. Each pixel independently and individually calculates a relative change in light. Each of the DVS pixels is configured to output an event signal in response to a change in light. Each pixel outputs an event signal when the relative change in light exceeds a threshold. The address event representations are configured to select one of the plurality of column lines and obtain an event signal output from DVS pixels connected to the selected column line. The control logic is configured to generate image data, including an object capable of generating a movement using an event signal output from each of the plurality of DVS pixels. The control logic divides the plurality of DVS pixels into a plurality of groups and allocates different readout times to each of the plurality of groups.

Hereinafter, example embodiments of the present inventive concept will be described in detail with reference to the accompanying drawings.

Figure 1:
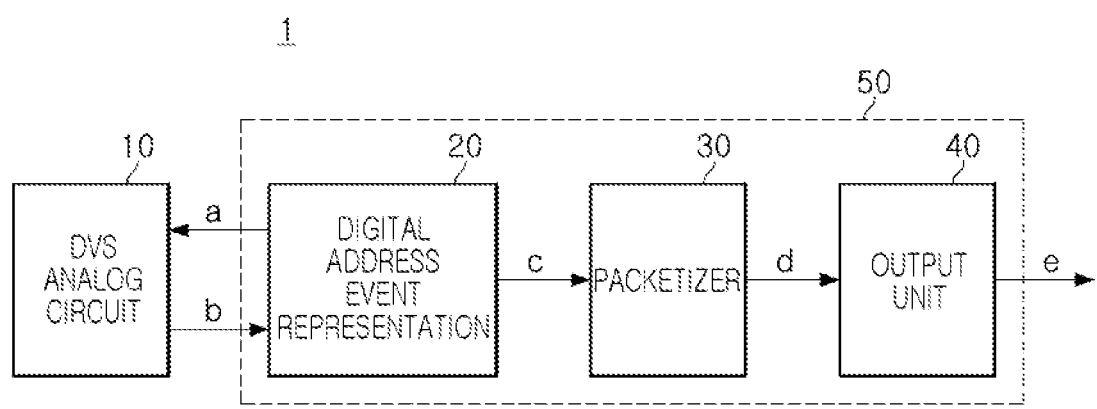
FIG. 1 is a block diagram illustrating a DVS system according to an example embodiment of the present inventive concept.

FIG. 1 is a block diagram illustrating a DVS system according to an example embodiment of the present inventive concept.

Referring to FIG. 1, a DVS system 1 may include a dynamic vision sensor (DVS) analog circuit 10, a digital address event representation (DAER) 20, a packetizer 30, and an output unit 40. The DVS system 1 may output at least one piece of image data including an object in which a movement can occur. The DAER 20, the packetizer 30, and the output unit 40 may be included in a control logic 50.

The DVS analog circuit 10 may output an event signal b in response to a change in relative intensity of light. Additionally or alternatively, the DVS analog circuit 10 may include a pixel array including a plurality of DVS pixels, and address event representations. The control logic 50 may control the address event representations. A plurality of DVS pixels may be connected to a plurality of row lines and a plurality of column lines. The plurality of row lines may extend in a first direction and the plurality of column lines may extend in a second direction. The address event representation may drive the pixel array in column units. The address event representation may determine one of the plurality of column lines as a selection column line. Additionally or alternatively, the address event representation may read an event signal from selection DVS pixels connected to the selection column line. The address event representation may also determine one of the plurality of column lines as a selection column line, and define a time required to read an event signal from selected DVS pixels connected to the selection column line as a readout time.

An event signal (b) may include an on-event signal and an off-event signal. For example, each of the DVS pixels may output an on-event signal when light becomes brighter than a predetermined magnitude and may output an off-event signal when the light becomes darker than a predetermined magnitude. When a change in light is less than a predetermined magnitude, each of the DVS pixels may not output the event signal (b).

The DAER 20 may control an operation of the DVS analog circuit 10. The DVS analog circuit 10 may receive a control signal (a) from the DAER 20 and control an operation of the pixel array in units of columns in response to the control signal (a). The control signal (a) may include a selection signal and a reset signal. The selection signal may be a signal for selecting one of a plurality of column lines included in the pixel array. The reset signal may be a signal for resetting each of the plurality of DVS pixels.

The DAER 20 may receive an event signal (b) from DVS pixels connected to the selected column. The DAER 20 may transmit data including pixel coordinates corresponding to an address of each of the DVS pixels and event information to the packetizer 30. The event information may include information regarding whether an event signal is present or absent or whether the event signal is an on-event signal or an off-event signal.

The packetizer 30 may packetize data received from the DAER 20 and sequentially transmit the packetized data to an output unit 40. The output unit 40 may generate packets received from the packetizer 30 as one piece of image data.

The DVS system 1, according to an example embodiment of the present inventive concept, may divide a plurality of DVS pixels into a plurality of groups. Additionally or alternatively, the DVS system 1 may allocate an optimized readout time for each of the plurality of groups. Therefore, the DVS system 1 may increase a frame rate.

Figure 2:
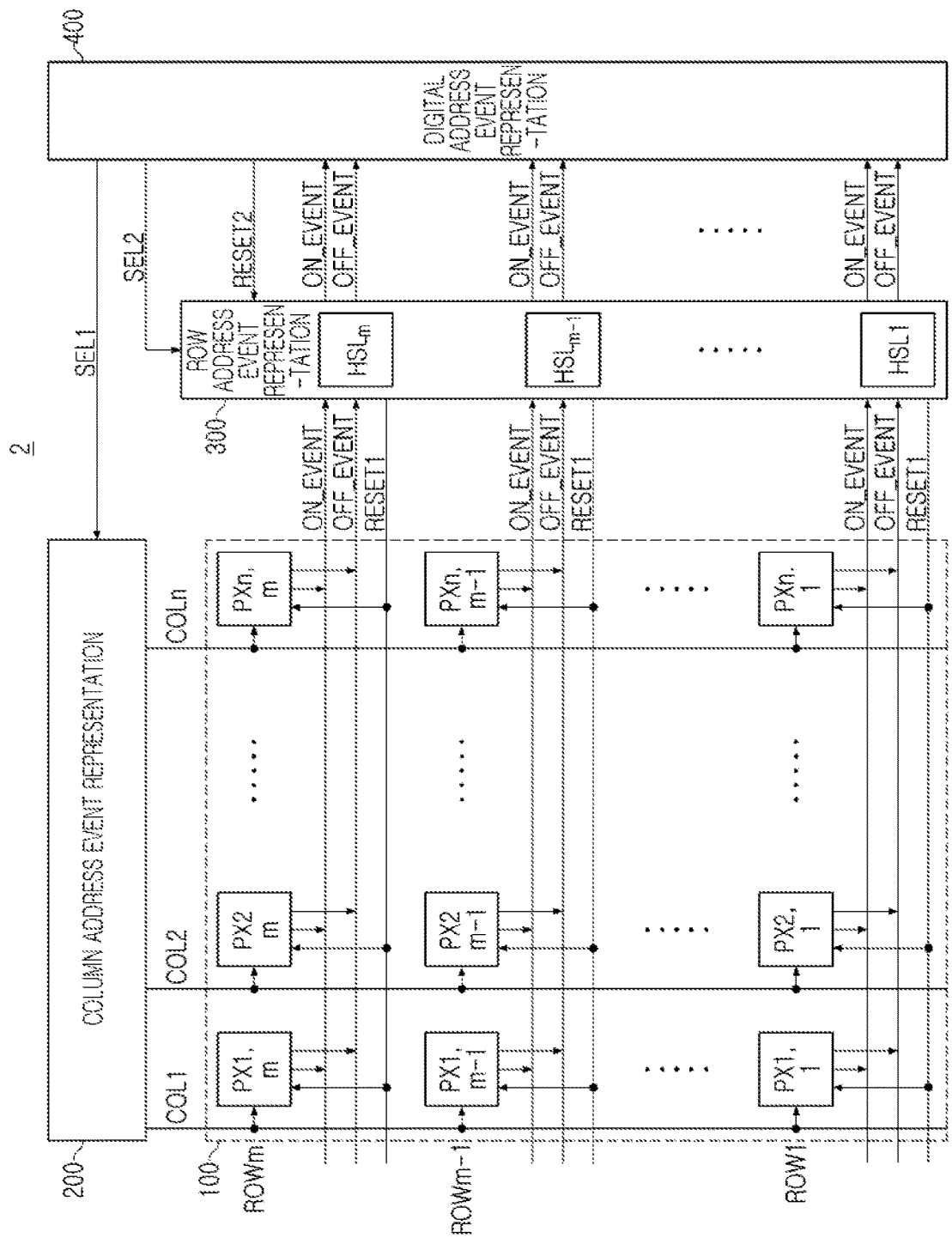
FIG. 2 is a diagram provided to explain an operation of a DVS system according to an example embodiment of the present inventive concept.

FIG. 2 is a view for explaining an operation of a DVS system according to an example embodiment of the present inventive concept.

Referring to FIG. 2, a DVS system 2 may include a pixel array 100, address event representations (AERs) 200 and 300, and a digital AER 400. The pixel array 100 may include a plurality of DVS pixels PX1, 1 to PXn, m. Each of the plurality of pixels may sense an amount of change in light.

The pixel array 100 may include a plurality of row lines ROW1 to ROWm a plurality of column lines COL1 to COLn. The plurality of row lines ROW1 to ROWm may extend in one direction. The plurality of column lines COL1 to COLn may cross the plurality of row lines ROW. The plurality of row lines ROW1 to ROWm and the plurality of column lines COL1 to COLn may be connected to the plurality of DVS pixels PX1, 1 to PXn, m.

AERs 200, 300 may include a column AER 200 and a row AER 300. In FIG. 2, the column AER 200 and the row AER 300 are illustrated as being implemented in separate logics but may be implemented in one logic.

The digital AER 400 may transmit a first selection signal SEL1 to each of the plurality of DVS pixels PX1, 1 to PXn, m through the column AER 200. The first selection signal SEL1 may be a signal for selecting one of the plurality of column lines COL1 to COLn included in the pixel array 100. For example, when the first column line COL1 is the selection column line, the first selection signal SEL1 may be input to each of the selection DVS pixels PX1, 1 to PX1, m connected to the first column line COL1 through the column AER 200. The selection DVS pixels PX1, 1 to PX1, m may be simultaneously turned-on in response to the first selection signal SEL1.

The digital AER 400 may transmit a second selection signal SEL2 to the row AER 300. The second selection signal SEL2 may connect each of row lines ROW1 to ROWm of the pixel array 100 to the row AER 300. The row AER 300 may obtain an event signal transmitted from the pixel array 100 in response to the second selection signal SEL2.

When the selection DVS pixels connected to the selection column line are simultaneously turned-on in response to the first selection signal SEL1, each of the selection DVS pixels may output an on-event (ON EVENT) signal or an off-event (OFF_EVENT) signal to the row AER 300. For example, when a first column line COL1 is a selection column line, the selection DVS pixels PX1, 1 to PX1, m connected to the first column line COL1 may simultaneously be turned-on in response to the first selection signal SEL1. The turned-on selection DVS pixels PX1, 1 to PX1, m may output the on-event (ON_EVENT) signal or the off-event (OFF_EVENT) signal to the row AER 300. According to an example embodiment, when a change in light among the selected DVS pixels PX1,1 to PX1, m is equal to or less than a predetermined size, the DVS pixel may not output both the On-event signal ON_EVENT and the Off-event (OFF_EVENT) signal.

The row AER 300 may obtain the on-event (ON EVENT) signal and the Off-event (OFF_EVENT) signal from the selected DVS pixels connected to the selection column line when each row line ROW of the pixel array 100 is connected to the row AER 300 in response to the second selection signal SEL2. For example, when the first column line COL1 is the selection column line, the row AER 300 may obtain the on-event (ON_EVENT) signal and the Off-event (OFF_EVENT) signal from the selected DVS pixels PX1,1 to PX1, m connected to the first column line COL1.

The row AER 300 may include hand-shaking logics HSL1 to HSLm corresponding to respective row lines ROW1 to ROWm of the pixel array 100. For example, a first hand-shaking logic HSL1 may correspond to a first row line ROW1, and a m−1 hand-shaking logic HSLm−1 may correspond to a m−1 row line ROWm−1, and a mth hand-shaking logic HSLm may correspond to a mth row line ROWm.

The hand-shaking logics HSL1 to HSLm may obtain an on-event (ON EVENT) signal or an off-event (OFF_EVENT) signal from selection DVS pixels connected to the selection column line. The hand-shaking logics HSL1 to HSLm may transmit a first reset signal RESET1 to the selection DVS pixels in response to an event signal obtained from the selection DVS pixels. The first reset signal RESET1 may mean a signal for resetting each of the selection DVS pixels.

For example, when the first column line COL1 is a selection column line, the first hand-shaking logic HSL1 may transmit the first reset signal RESET1 to first selection DVS pixel PX1,1, in response to an event signal obtained from the first selection DVS pixel PX1,1 connected to the first column line COL1. The m−1 hand-shaking logic HSLm−1 may transmit the first reset signal RESET1 to m−1 DVS pixel PX1, m−1, in response to an event signal obtained from the m-1 DVS pixel PX1, m-1 connected to the first column line COL1. The mth hand-shaking logic HSLm may transmit the first reset signal RESET1 to the mth selection DVS pixel PX1, m in response to an event signal received from the mth selection DVS pixel PX1, m connected to the first column line COL1.

The digital AER 400 may receive the event signal of the selection DVS pixels connected to the selection column line from the row AER 300. The digital AER 400 may transmit a second reset signal RESET2 to the row AER 300, in response to the event signal received from the row AER 300. The second reset signal RESET2 may mean a voltage for resetting the row AER 300.

For example, when the first column line COL1 is a selection column line, the digital AER 400 may receive an event signal of the selection DVS pixels PX1, 1 to PX1, m connected to the first column line COL1 from the row AER 300. The digital AER 400 may transmit a second reset signal RESET2 to the row AER 300, in response to the event signal received from the row AER 300. The second reset signal RESET2 may reset the row AER 300. The row AER 300 may receive an event signal from the DVS pixels PX2, 1 to PX2, m connected to the second column line COL2 when the second column line COL2 is selected after the row AER 300 is reset.

In each of the plurality of column lines COL1 to COLn of the pixel array 100, the same readout time may be allocated. However, a physical distance between the plurality of DVS pixels PX1,1-PXn, m and the AERs 200 and 300 included in the pixel array 100 may be different from for each of the plurality of DVS pixels PX1,1-PXn, m. Therefore, depending on a position of the plurality of DVS pixels PX1, 1-PXn, m, a time required for the row AER 300 to read an event signal from the plurality of DVS pixels PX1, 1-PXn, m may be different from for each of the plurality of DVS pixels PX1,1-PXn, m. If the same readout time is allocated to each of the plurality of column lines COL1 to COLn, efficiency of the frame rate may be deteriorated.

According to an example embodiment of the present inventive concept, a DVS system 1 may divide the plurality of DVS pixels PX1, 1 to PXn, m into a plurality of groups in consideration of a physical distance between the plurality of DVS pixels PX1, 1 to PXn, m and the AERs 200 and 300, and may allocate different readout times to each of the plurality of groups. Since an optimized readout time can be allocated to each of the plurality of groups, the frame rate of the DVS system 1 can be increased.

Figure 3:
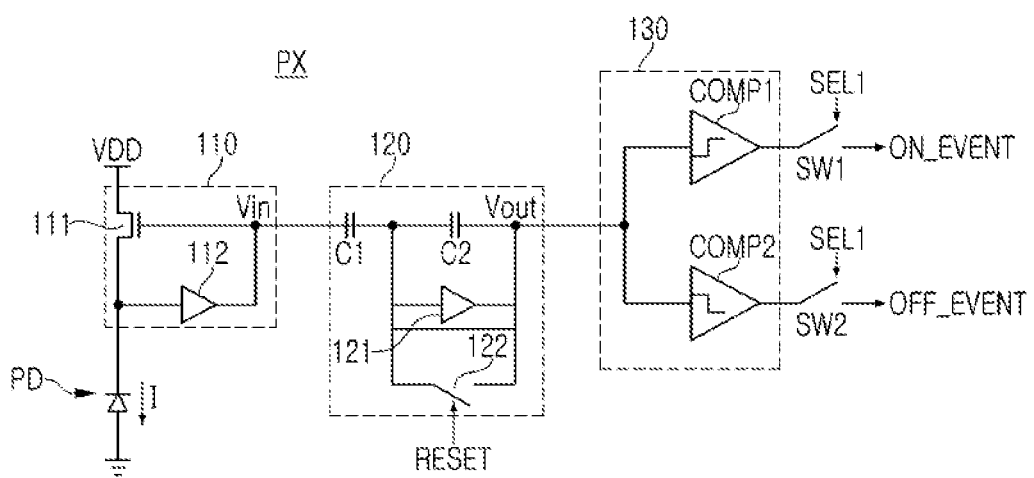
FIG. 3 is a circuit diagram schematically illustrating a DVS pixel according to an example embodiment of the present inventive concept.

FIG. 3 is a circuit diagram illustrating a DVS pixel according to an example embodiment of the present inventive concept.

Referring to FIG. 3, a DVS pixel PX may include a photodiode PD, a current/voltage converter 110, an amplifying circuit 120, a comparison circuit 130, a first switch SW1, and a second switch SW2. The photodiode PD is an example of a photoelectric conversion element and may generate a photocurrent I according to an intensity of incident light.

The current/voltage converter 110 may include a conversion transistor 111 and a first amplifier 112. The conversion transistor 111 may be connected between a power supply voltage VDD and the photodiode PD, and the first amplifier 112 may amplify a voltage of the photodiode and output the amplified voltage to the first voltage Vin. For example, the current/voltage converter 110 may output the first voltage Vin corresponding to the photocurrent I by sensing the photocurrent I flowing through the photodiode PD.

The amplifying circuit 120 may include a first capacitor C1, a second capacitor C2, a second amplifier 121, and a reset switch 122. The reset voltage may be a constant voltage. The reset switch 122 may reset a second voltage Vout to a reset voltage according to a reset control signal RESET received from row AER. The reset voltage may be a constant voltage.

The amplifying circuit 120 may output a second voltage Vout, wherein the second voltage Vout is related to an amount of change of the first voltage Vin over time, based on the first voltage Vin. For example, the amplifying circuit 120 may amplify and output an amount of increase or decrease in a voltage corresponding to an amount of change in light.

The comparison circuit 130 may include a first comparator COMP1 and a second comparator COMP2. The comparison circuit 130 may generate an on-event ON EVENT signal or an off-event OFF EVENT signal through the change in the second voltage Vout. For example, the first comparator COMP1 may compare the second voltage Vout with an on-threshold voltage, and generate an on-event ON_EVENT signal according to the comparison result. The second comparator COMP2 may compare the second voltage Vout with an off-threshold voltage, and generate an off-event OFF EVENT signal according to the comparison result.

For example, the comparison circuit 130 may generate the on-event ON_EVENT signal or the off-event OFF_EVENT signal when the change in light corresponding to the DVS pixel PX is equal to or greater than a predetermined reference range. For example, the on-event ON_EVENT signal may be at a high level when the light corresponding to the DVS pixel PX becomes brighter than the reference range. The off-event OFF_EVENT signal may be at a high level when the light corresponding to the DVS pixel PX becomes darker than the reference range.

The DVS pixel PX may receive a first selection signal SEL1 from the digital AER 400 through the column AER 200. The first switch SW1 and the second switch SW2 may be turned-on in response to the first selection signal SELL When the first switch SW1 and the second switch SW2 are turned on, the generated on-event ON_EVENT signal or off-event OFF EVENT signal may be output to a row AER. For example, when the DVS pixel PX generates the on-event ON_EVENT signal T, the DVS pixel PX may output the on-event ON EVENT signal to the row AER through the first switch SW1 in response to the first selection signal SELL When the DVS pixel PX generates the off-event signal OFF_EVENT, the DVS pixel PX may output the off-event OFF_EVENT signal to the row AER through the second switch SW2 in response to the first selection signal SELL If the DVS pixel PX does not generate an event signal, the DVS pixel PX may not output both the on-event ON_EVENT signal and the off-event OFFEVENT signal.

After the comparison circuit 130 outputs the on-event ON_EVENT signal or the Off-event OFF EVENT signal, the amplifying circuit 120 of the DVS pixel PX in which the event signal is generated may receive a reset control signal RESET from the row AER. The DVS pixel PX may reset a second voltage Vout to a reset voltage in response to the reset control signal RESET.

Figure 4:
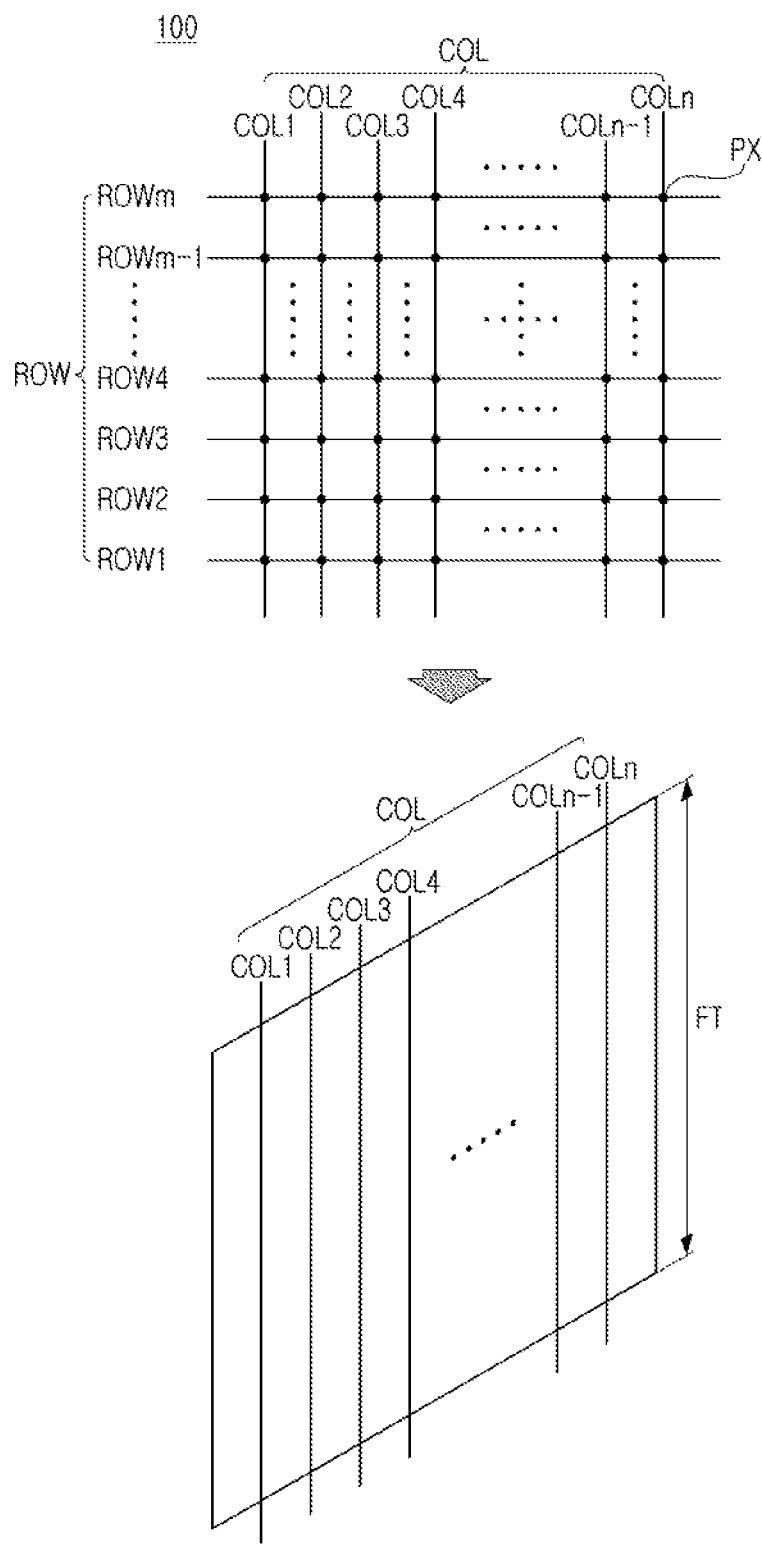
FIG. 4 is a block diagram provided to explain a readout operation of a DVS system according to an example embodiment of the present inventive concept.

FIG. 4 is a view provided to explain an operation of a DVS system according to an example embodiment of the present inventive concept.

Referring to FIG. 4, a pixel array 100 of a DVS system according to an example embodiment of the present inventive concept may include a plurality of pixels PX. The plurality of pixels PX may be connected to a plurality of row lines ROW (ROW1 to ROWm) and a plurality of column lines COL (COL1 to COLn). The DVS may drive the plurality of pixels PX in units of a plurality of column lines COL. For example, a time required to drive a selection driving line among the plurality of column lines COL and read an event from the pixels PX connected to the selection driving line may be defined as one horizontal period. An image sensor may sequentially drive the plurality of column lines COL.

Meanwhile, a frame period FT of the image sensor may be defined as a time required to read an event from pixels PX included in the pixel array 100. For example, the frame period FT may be equal to or greater than a product of the number of column lines COL and the horizontal period. The shorter the frame period FT of the image sensor, the larger the number of image frames that DVS can be generated during the same time.

The DVS system, according to an example embodiment of the present inventive concept, may divide DVS pixels into a plurality of groups, and allocate an optimized horizontal period to each of the plurality of groups. Therefore, since the frame period of the image sensor can be reduced, the DVS system can increase the frame rate.

Figure 5:
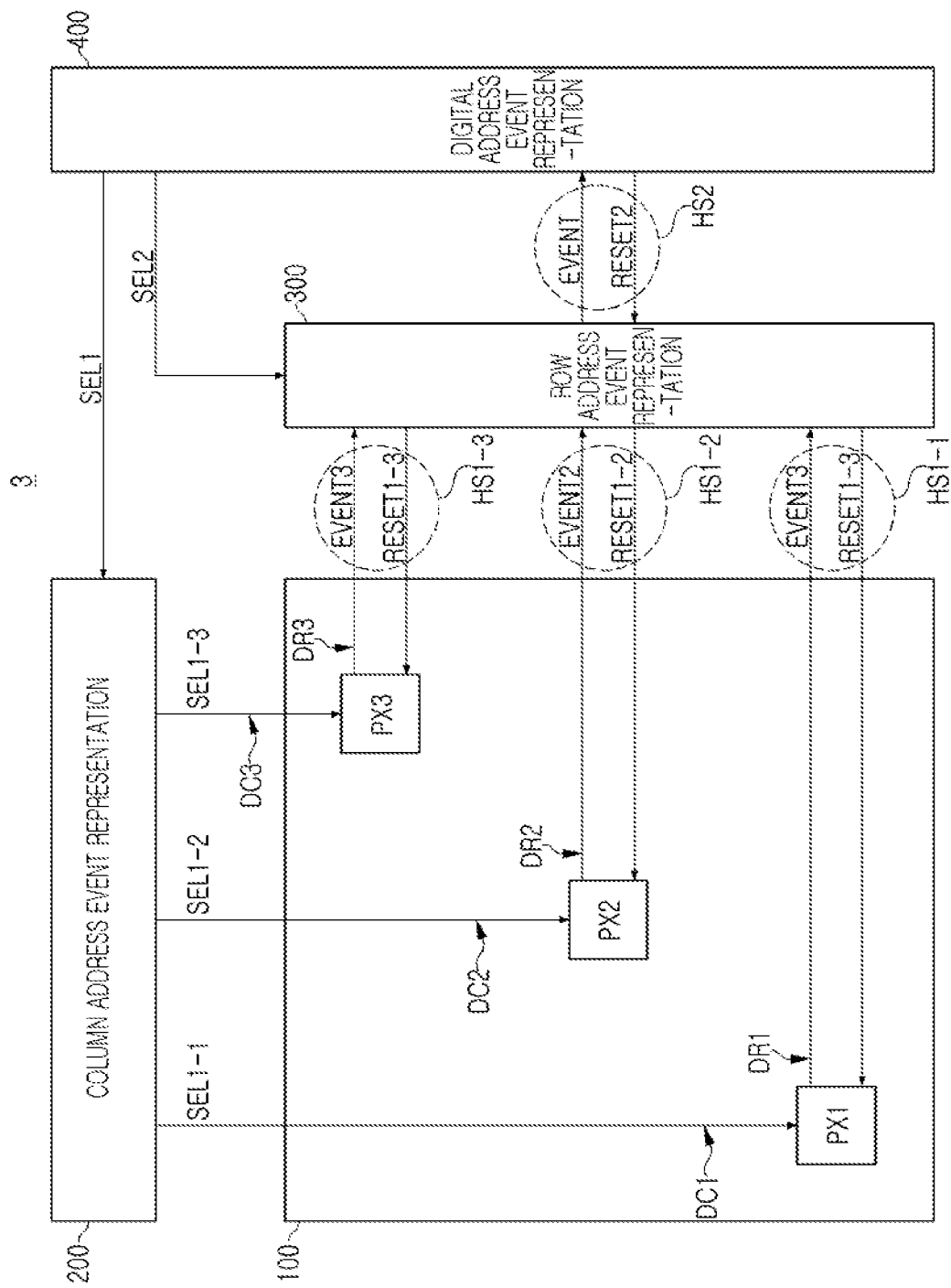
FIG. 5 is a block diagram provided to explain a readout operation of a DVS system according to an example embodiment of the present inventive concept.
Figure 6:
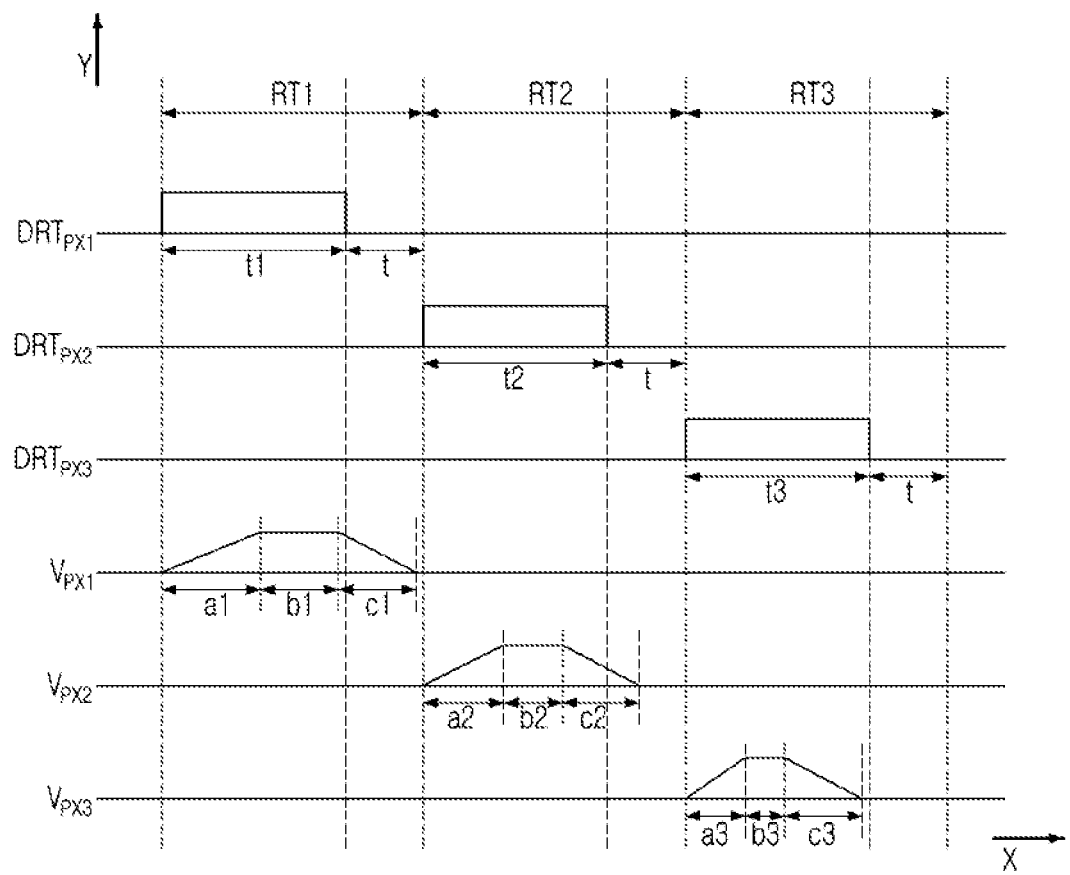
FIG. 6 is a graph provided to explain a readout operation of a DVS system according to an example embodiment of the present inventive concept.

FIG. 5 is a block diagram provided to explain a readout operation of a DVS system according to an example embodiment of the present inventive concept, and FIG. 6 is a graph provided to explain a readout operation of a DVS system according to an example embodiment of the present inventive concept. In FIG. 6, an X-axis may mean a time, and a Y-axis may mean signals $DRT_{PX1}$, $DRT_{PX2}$, and $DRT_{PX3}$ transmitted from the DAER 400 to the DVS pixels PX1, PX2, and PX3. The Y-axis may mean a magnitude of voltages $V_{PX1}$, $V_{PX2}$, and $V_{PX3}$ reaching the DVS pixels PX1, PX2, and PX3 when transmitting a selection signal from the DAER 400 to the DVS pixels PX1, PX2, and PX3.

Referring to FIGS. 5 and 6, a pixel array 100 may include a first DVS pixel PX1, a second DVS pixel PX2, and a third DVS pixel PX3. A DVS system 3 may obtain an event signal from the first DVS pixel PX1 during the first readout time RT1. The DVS system 3 may also obtain an event signal from the second DVS pixel PX2 during the second readout time RT2. The DVS system 3 may also obtain an event signal from the third DVS pixel PX3 during the third readout time RT3.

The digital AER 400 may transmit first, second, and third selection signals SEL1-1, SEL1-2, and SEL1-3 to each of the plurality of DVS pixels PX1, PX2, and PX3 through the column AER 200. For example, to select the first DVS pixel PX1 connected to the first column line, the digital AER 400 may transmit the first selection signal SEL1-1 to the first DVS pixel PX1 through the column AER 200. To select the second DVS pixel PX2 connected to the second column line, the digital AER 400 may transmit the second selection signal SEL1-2 to the second DVS pixel PX2 through the column AER 200. To select the third DVS pixel PX3 connected to the third column line, the digital AER 400 may transmit the third selection signal SEL1-3 to the third DVS pixel PX3 through the column AER 200.

In this case, a physical distance between the plurality of DVS pixels PX1, PX2 and PX3 and the column AER 200 may be different for each of the plurality of DVS pixels PX1, PX2 and PX3. For example, a physical distance between the first DVS pixel PX1 and the column AER 200 may be a first distance DC1, a physical distance between second DVS pixel PX2 and the column AER 200 may be a second distance DC2, and a physical distance between the third DVS pixel PX3 and the column AER 200 may be a third distance DC3. The first distance D1 may be greater than the second distance DC2, and the second distance DC2 may be greater than the third distance DC3.

Each of the plurality of DVS pixels PX1, PX2, and PX3 may be turned on in response to the first, second, and third selection signals SEL1-1, SEL1-2, and SEL1-3. Since a physical distance between the plurality of DVS pixels PX1, PX2, and PX3 and the column AER 200 is different for each of the plurality of DVS pixels PX1, PX2, and PX3, a time taken for the plurality of DVS pixels PX1, PX2, and PX3 to be turned on, after the digital AER 400 transmits the first, second, and third selection signals SEL1-1, SEL1-2, and SEL1-3 to each of the plurality of DVS pixels PX1, PX2, and PX3 through the column AER 200, may be different from each other.

For example, a time taken for the first DVS pixel PX1 to be turned-on after the digital AER 400 transmits the first selection signal SEL1-1 to the first DVS pixel PX1 through the column AER 200 may be a first time (a1). A time taken for the second DVS pixel PX2 to be turned on, after the digital AER 400 transmits the second selection signal SEL1-2 to the second DVS pixel PX2 through the column AER 200, may be a second time (a2). A time taken for the third DVS pixel PX3 to be turned on, after the digital AER 400 transmits the third selection signal SEL1-3 to the third DVS pixel PX3 through the column AER 200, may be a third time (a3). The first time (a1) may be longer than the second time (a2), and the second time (a2) may be longer than the third time (a3).

When each of the plurality of DVS pixels PX1, PX2, and PX3 is turned-on, each of the plurality of DVS pixels PX1, PX2, and PX3 may transmit event signals EVENT1, EVENT2, and EVENT3 to the row AER 300. When the row AER 300 obtains the event signals EVENT1, EVENT2, and EVENT3 from each of the plurality of DVS pixels PX1, PX2, and PX3, the row AER 300 may transmit first, second, and third reset signals RESET1-1, RESET1-2, and RESET1-3 to each of the plurality of DVS pixels PX1, PX2, and PX3.

In this case, a physical distance between the plurality of DVS pixels PX1, PX2, and PX3 and the row AER 300 may be different for each of the plurality of DVS pixels PX1, PX2, and PX3. For example, a physical distance between the first DVS pixel PX1 and the row AER 300 may be a first distance DR1, a physical distance between the second DVS pixel PX2 and the row AER 300 may be a second distance DR2, and a physical distance between the third DVS pixel PX3 and the row AER 300 may be a third distance DR3. The first distance DR1 may be greater than the second distance DR2, and the second distance DR2 may be greater than the third distance DR3.

Each of the plurality of DVS pixels PX1, PX2, and PX3 may be reset in response to the first, second, and third reset signals RESET1-1, RESET1-2, and RESET1-3. Since a physical distance between the plurality of DVS pixels PX1, PX2, and PX3 and the row AER 300 is different for each of the plurality of DVS pixels PX1, PX2, and PX3, a time for the plurality of DVS pixels PX1, PX2, and PX3 to be reset after the row AER 300 transmits the first, second, and third reset signals RESET1-1, RESET1-2, and RESET1-3 to each of the plurality of DVS pixels PX1, PX2, and PX3 may be different from each other.

For example, after the first DVS pixel PX1 transmits the event signal EVENT1 to the row AER 300, a time taken for the first DVS pixel PX1 to be reset in response to the first reset signal RESET1-1 may be a first time (b1). After the second DVS pixel PX2 transmits the event signal EVENT2 to the row AER 300, a time taken for the second DVS pixel PX2 to be reset in response to the second reset signal RESET1-2 may be a second time (b2). After the third DVS pixel PX3 transmits the event signal EVENT3 to the row AER 300, a time taken for the third DVS pixel PX3 to be reset in response to the third reset signal RESET1-3 may be a third time (b3). The first time (b1) may be longer than the second time (b2), and the second time (b2) may be longer than the third time (b3).

When the row AER 300 transmits an event received from the first DVS pixel PX1 to the DAER 400, the row AER 300 may receive a second reset signal RESET2 from the DAER 400. The row AER 300 may be reset in response to a second reset signal RESET2. When the row AER 300 transmits an event received from the second DVS pixel PX2 to the DAER 400, the row AER 300 may receive a second reset signal RESET2 from the DAER 400. The row AER 300 may be reset in response to a second reset signal RESET2. When the row AER 300 transmits an event received from the third DVS pixel PX3 to the DAER 400, the row AER 300 may receive a second reset signal RESET2 from the DAER 400. The row AER 300 may be reset in response to a second reset signal RESET2.

After the row AER 300 transmits an event received from each of the plurality of DVS pixels PX1, PX2, and PX3 to the DAER 400, a time for the row AER 300 to be reset may be the same for each of the plurality of DVS pixels PX1, PX2, and PX3. For example, after the row AER 300 transmits an event received from the first DVS pixel PX1 to the DAER 400, a time for the row AER 300 to be reset may be a first time (c1). After the row AER 300 transmits an event received from the second DVS pixel PX2 to the DAER 400, a time taken for the row AER 300 to be reset may be a second time (c2). After the row AER 300 transmits an event received from the third DVS pixel PX3 to the DAER 400, a time taken for the row AER 300 to be reset may be a third time (c3). The first time (c1), the second time (c2), and the third time (c3) may be the same to each other.

Each of the readout times RT1, RT2, and RT3 may include data readout times t1, t2, and t3, and a margin time (t). For example, the first readout time RT1 may include a first data readout time (t1) and a margin time (t), the second readout time RT2 may include a second data readout time (t2) and a margin time (t), and the third readout time RT3 may include a third data readout time (t3) and a margin time (t).

The first time (c1), the second time (c2), and the third time (c3) may be the same as each other. However, the first time (a1), the second time (a2), and the third time (a3) may be different from each other. Additionally or alternatively, the first time (b1), the second time (b2), and the third time (b3) may be different from each other.

Readout times RT1, RT2, and RT3 may be determined in consideration of a worst case, among the plurality of DVS pixels PX1, PX2, and PX3 included in the pixel array 100. Therefore, the readout times RT1, RT2, and RT3 may be to the same as each other.

For example, the first DVS pixel PX1 has the largest physical distance among the plurality of DVS pixels PX1, PX2, and PX3. The physical distance may mean a physical distance DC1 between the first DVS pixel PX1 and the column AER 200 and a physical distance DR1 between the first DVS pixel PX1 and the row AER 300. Therefore, the readout times RT2 and RT3 of the remaining DVS pixels PX2 and PX3 may be determined as the readout time RT1 of the first DVS pixel PX1 with the largest physical distance. Since the first time (t1), the second time (c2), and the third time (c3) are the same as each other, a readout time RT1 may be determined based on the data readout time (t1) of the first DVS pixel PX1.

The DVS system 3 according to an example embodiment of the present inventive concept may divide a plurality of DVS pixels PX1, PX2, and PX3 into a plurality of groups in consideration of a physical distance of each of the plurality of DVS pixels PX1, PX2, and PX3, and may allocate different readout times to each of the plurality of groups. Since an optimized readout time may be allocated to each of the plurality of groups, a frame rate of the DVS system 3 may be increased.

Figure 7:
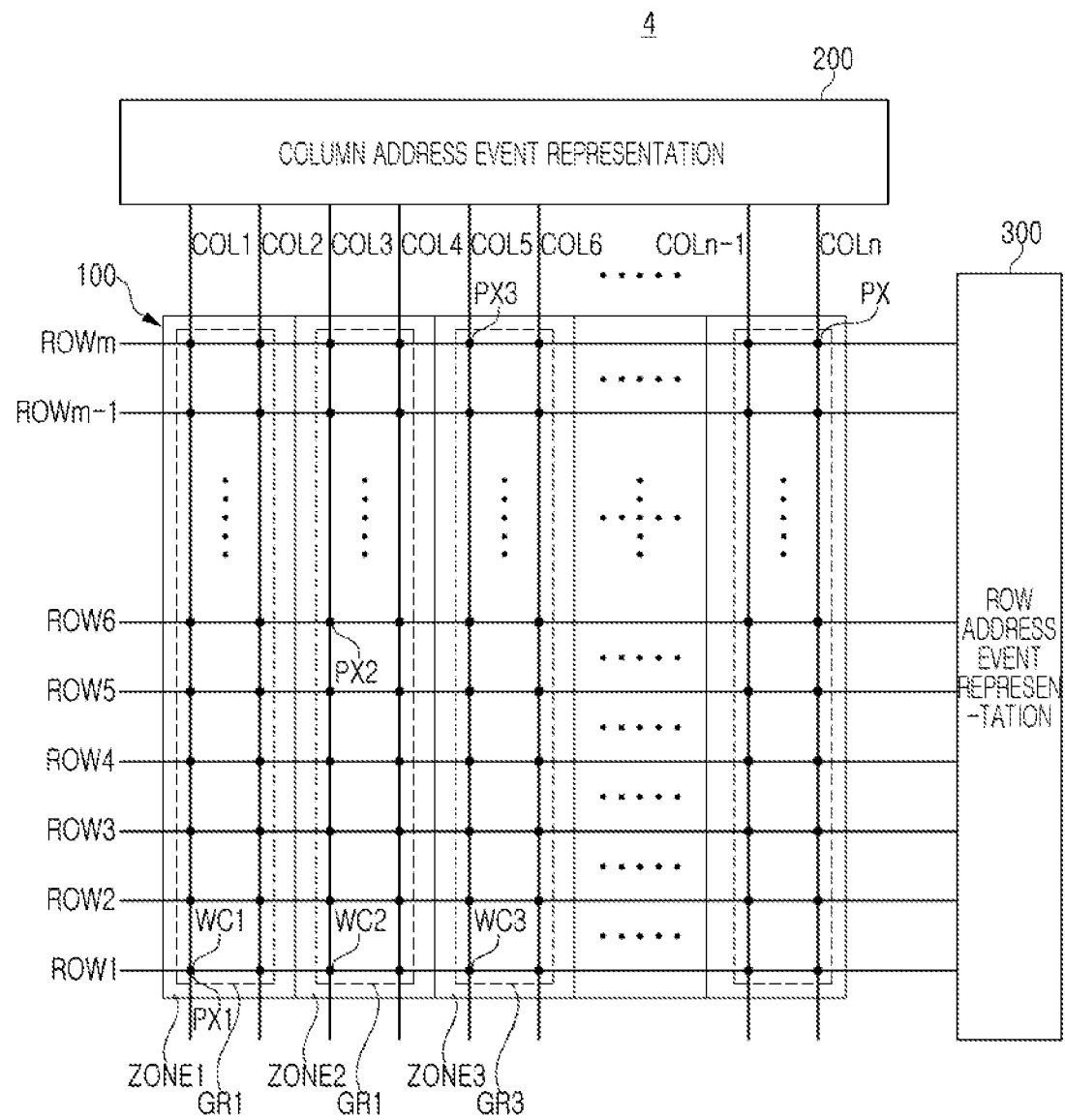
FIG. 7 is a block diagram provided to explain a readout operation of a DVS system according to an example embodiment of the present inventive concept.
Figure 8:
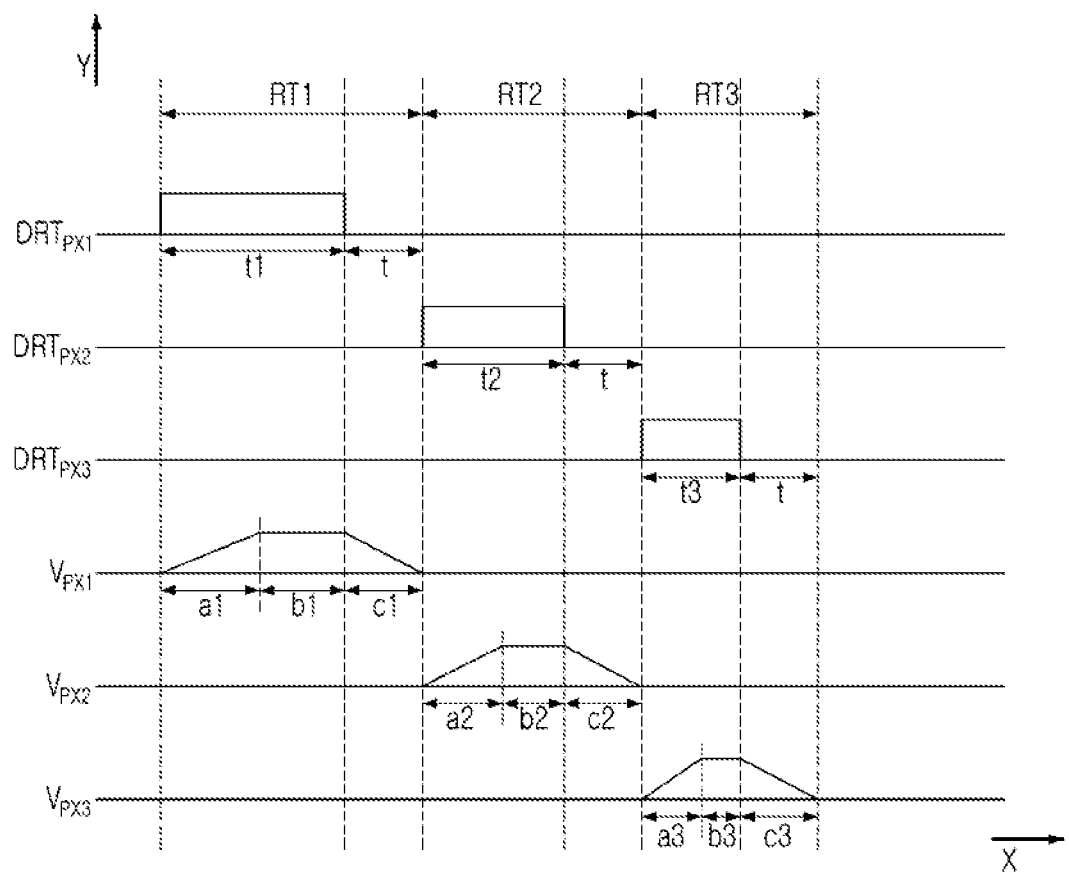
FIG. 8 is a graph provided to explain a readout operation of a DVS system according to an example embodiment of the present inventive concept.

FIG. 7 is a block diagram provided to explain a readout operation of a DVS system according to an example embodiment of the present inventive concept, and FIG. 8 is a graph provided to explain a readout operation of a DVS system according to an example embodiment of the present inventive concept.

Referring to FIG. 7, a pixel array 100 may include a plurality of DVS pixels PX. The plurality of pixels PX may be connected to a plurality of row lines ROW1 to ROWm and a plurality of column lines COL1 to COLn.

The plurality of DVS pixels PX may be divided into a plurality of groups in consideration of a physical distance of each of the plurality of DVS pixels PX. For example, DVS pixels connected to the first column line COL1 and DVS pixels connected to the second column line COL2 may be divided into a first group GR1. DVS pixels connected to the third column line COL3 and DVS pixels connected to the fourth column line COL4 may be divided into a second group GR2. DVS pixels connected to the fifth column line COL5 and DVS pixels connected to the sixth column line COL6 may be divided into a third group GR3.

For example, the first group GR1 may include DVS pixels present in the first region ZONE1, the second group GR2 may include DVS pixels present in the second region ZONE2, and third group GR3 may include DVS pixels present in the third region ZONE3.

Unlike the graph of FIG. 6, the graph of FIG. 8 may have different data readout times t1, t2, and t3 for each of a plurality of groups. Therefore, the readout times RT1, RT2, and RT3 may be different for each of the plurality of groups.

Referring to FIGS. 7 and 8, the DVS system 4 may allocate different readout times RT1, RT2, and RT3 to each of the groups GR1, GR2, and GR3. For example, the first readout time RT1 may be allocated to the first group GR1 including the DVS pixels in the first region ZONE1. The second readout time RT2 may be allocated to the second group GR2 including the DVS pixels in the second region ZONE2. The third readout time RT3 may be allocated to the third group GR3 including the DVS pixels in the third region ZONE3.

Each of the readout times RT1, RT2, and RT3 may include data readout times t1, t2, and t3 and a margin time t. The margin time t may be the same for each of the readout times RT1, RT2, and RT3. Therefore, each of the readout times RT1, RT2, and RT3 may be determined according to the data readout times t1, t2, and t3 included in each of the readout times RT1, RT2, and RT3.

Each of the data readout times t1, t2, and t3 may be determined in consideration of a worst case among DVS pixels included in each of the groups GR1, GR2, and GR3. For example, the first data readout time (t1) of the first group GR1 may be determined as a data readout time of a first representative pixel WC1 with the largest physical distance among the DVS pixels included in the first group GR1. The second data readout time (t2) of the second group GR2 may be determined as a data readout time of a second representative pixel WC2 with the largest physical distance among the DVS pixels included in the second group GR2. The third data readout time (t3) of the third group GR3 may be determined as a data readout time of a third representative pixel WC3 with the largest physical distance among the DVS pixels included in the third group GR3.

For example, after the digital AER 400 transmits the first selection signal to the first representative pixel WC1 through the column AER 200, a time taken for the first representative pixel WC1 to be turned-on may be a first time (a1). After the digital AER 400 transmits the first selection signal to the second representative pixel WC2 through the column AER 200, a time taken for the second representative pixel WC2 to be turned-on may be a second time (a2). After the digital AER 400 transmits the first selection signal to the third representative pixel WC3 through the column AER 200, a time taken for the third representative pixel WC3 to be turned-on may be a third time (a3).

Additionally or alternatively, after the first representative pixel WC1 transmits an event signal to the row AER 300, a time taken for the first representative pixel WC1 to be reset in response to the first reset signal may be a first time (b1). After the second representative pixel WC2 transmits an event signal to the row AER 300, a time taken for the second representative pixel WC2 to be reset in response to the second reset signal may be a second time (b2). After the third representative pixel WC3 transmits an event signal to the row AER 300, a time taken for the third representative pixel WC3 to be reset in response to the third reset signal may be a third time (b3).

After the row AER 300 transmits an event received from the first representative pixel WC1 to the DAER 400, a time taken for the row AER 300 to be reset may be a first time (c1). After the row AER 300 transmits an event received from the second representative pixel WC2 to the DAER 400, a time taken for the row AER 300 to be reset may be a second time (c2). After the row AER 300 transmits an event received from the third representative pixel WC3 to the DAER 400, a time taken for the row AER 300 to be reset may be a third time (c3).

A physical distance of the first representative pixel WC1 may be greater than a physical distance of the second representative pixel WC2. Additionally or alternatively, the physical distance of the second representative pixel WC2 may be greater than a physical distance of the third representative pixel WC3. Therefore, the first time (a1) may be longer than the second time (a2), and the second time (a2) may be longer than the third time (a3). Additionally or alternatively, the first time (b1) may be longer than the second time (b2), and the second time (b2) may be longer than the third time (b3).

The first data readout time (t1) may correspond to the sum of the first time (a1) and the first time (b1), the second data readout time (t2) may correspond to the sum of the second time (a2) and the second time (b2), and the third data readout time (t3) may correspond to the sum of the third time (a3) and the third time (b3). For example, the first data readout time (t1) may be longer than the second data readout time (t2), and the second data readout time (t2) may be longer than the third data readout time (t3). The margin time t may correspond to the first time c1, the second time c2, or the third time c3. For example, the margin time t may be the same for each of the readout times RT1, RT2, and RT3.

Therefore, the readout time of the first pixel PX1 included in the first group GR1 may be determined as a first readout time RT1, the readout time of the second pixel PX2 included in the second group GR2 may be determined as a second readout time RT2, and the readout time of the third pixel PX3 included in the third group GR3 may be determined as a third readout time RT3.

If the readout times RT1, RT2, and RT3 are equal, there may be a smaller gap between the end of the first time c1 and the end of the margin time t for the first readout time RT1 compared to the gap between the end of the second time c2 and the end of the margin time t for the second readout time RT2, or to the gap between the end of the third time c3 and the end of the margin time t for the third readout time RT3. Therefore, to reduce this gap (and thereby to increase the frame rate) the first readout time RT1 may be longer than the second readout time RT2, and the second readout time RT2 may be longer than the third readout time RT3.

Accordingly, the DVS system 4 according to an example embodiment of the present inventive concept may divide a plurality of DVS pixels PX into a plurality of groups in consideration of the physical distance of each of the plurality of DVS pixels PX, and different readout times may be allocated. Since an optimized readout time can be allocated to each of the plurality of groups, the frame rate of the DVS system 4 can be increased.

Accordingly, in an embodiment of the present inventive concept, a method of operating a dynamic vision sensor may include performing a first readout of a first group of DVS pixels (e.g., first group GR1) based on a first readout time (e.g., first readout time RT1); performing a second readout of a second group of DVS pixels (e.g., second group GR2) based on a second readout time (e.g., second readout time RT2) having a shorter duration than the first readout time; identifying event signals indicating a change in light conditions based on the first readout and the second readout; and generating image data based on the event signals. In some cases, the first readout time is determined based on a first distance between at least one of the first group of DVS pixels and one or more address event representations (e.g., column address event representation 200 and row address event representation 300), and the second readout time is determined based on a second distance between at least one of the second group of DVS pixels and the address event representations, the second distance being smaller than the first distance.

Figure 9:
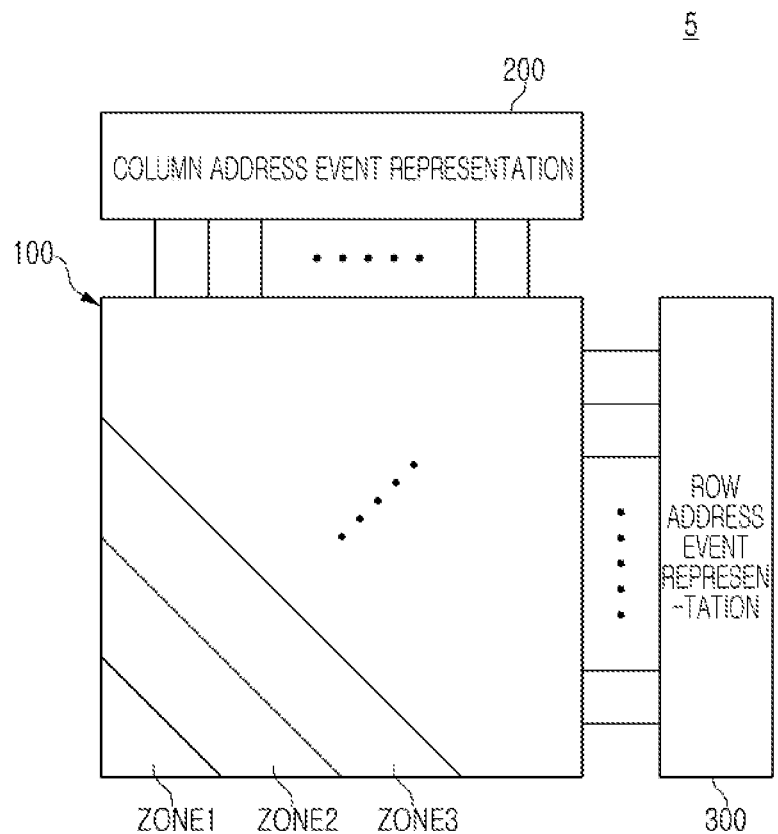
FIGS. 9 and 10 are diagrams provided to explain a readout operation of a DVS system according to an example embodiment of the present inventive concept.
Figure 10:
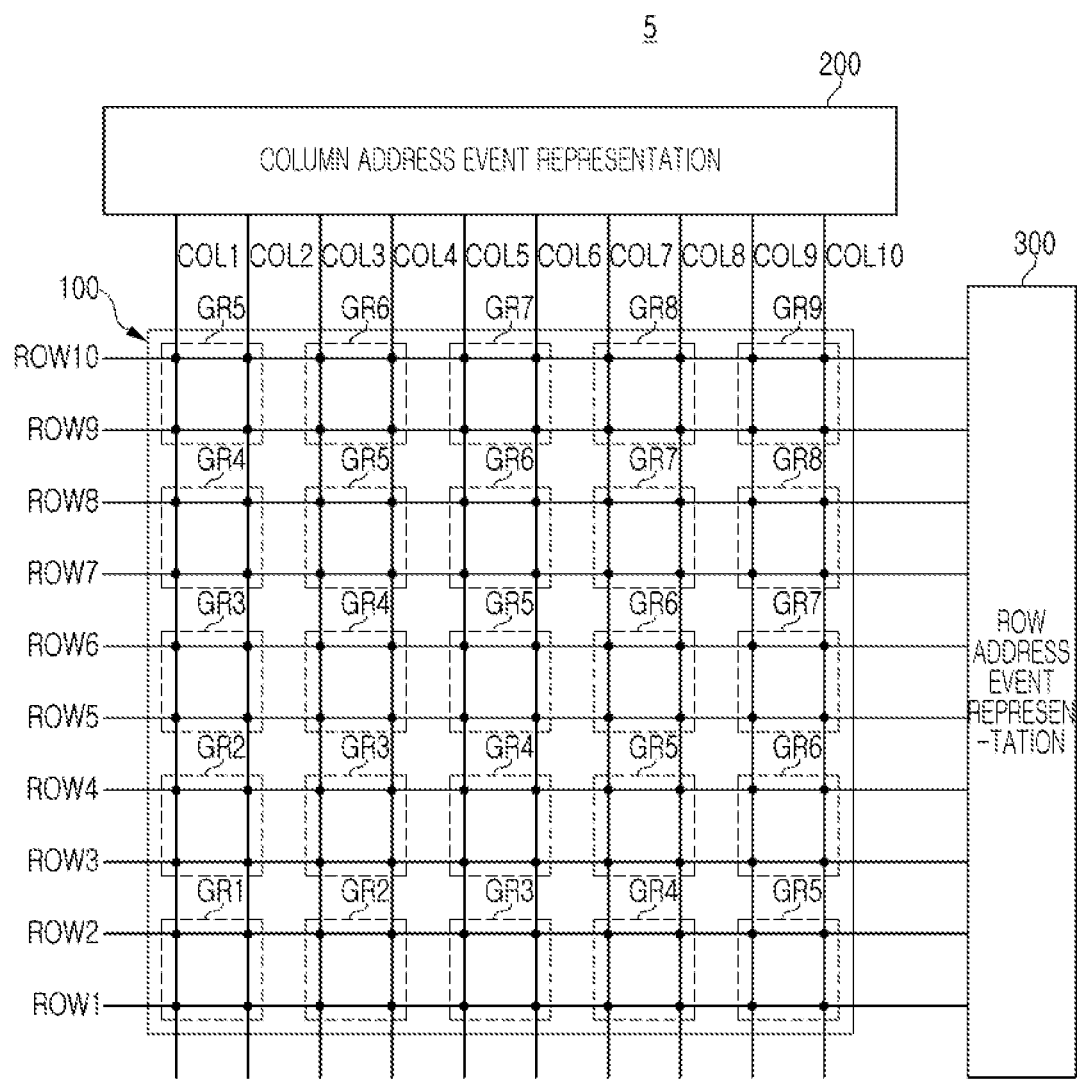

FIGS. 9 and 10 are diagrams provided to explain a readout operation of a DVS system according to an example embodiment of the present inventive concept.

In a DVS system 4 of FIG. 7, DVS pixels connected to the same column line may be divided into the same group. Unlike the DVS system 4 of FIG. 7, in a DVS system 5 of FIG. 9, DVS pixels connected to the same column line may be divided into different groups.

For example, a pixel connected to a first column line COL1 and a first row line ROW1, a pixel connected to a first column line COL1 and a second row line ROW2, a pixel connected to a second column line COL2 and a first row line ROW1, and a pixel connected to a second column line COL2 and a second row line ROW2 may be divided into a first group GR1. For example, the first group GR1 may include DVS pixels in a first region ZONE1.

A pixel connected to a first column line COL1 and a third row line ROW3, a pixel connected to a first column line COL1 and a fourth row line ROW4, a pixel connected to a second column line COL2 and a third row line ROW3, a pixel connected to a second column line COL2 and a fourth row line ROW4, a pixel connected to a third column line COL3 and a first row line ROW1, a pixel connected to a third column line COL3 and a second row line ROW2, a pixel connected to a fourth column line COL4 and a first row line ROW1, and a pixel connected to a fourth column line COL4 and a second row line ROW2 may be divided into a second group GR2. For example, the second group GR2 may include DVS pixels in a second region ZONE2.

A pixel connected to a first column line COL1 and a fifth row line ROW5, a pixel connected to a first column line COL1 and a sixth row line ROW6, a pixel connected to a second column line COL2 and a fifth row line ROW5, a pixel connected to a second column line COL2 and a sixth row line ROW6, a pixel connected to a third column line COL3 and a third row line ROW3, a pixel connected to a third column line COL3 and a fourth row line ROW4, a pixel connected to a fourth column line COL4 and a third row line ROW3, a pixel connected to a fourth column line COL4 and a fourth row line ROW4, a pixel connected to a fifth column line COL5 and a first row line ROW1, a pixel connected to a fifth column line COL5 and a second row line ROW2, a pixel connected to a sixth column line COL6 and a first row line ROW1, and a pixel connected to a sixth column line COL6 and a second row line ROW2 may be divided into a third group GR2. For example, the third group GR3 may include DVS pixels in a third region ZONE3.

A readout time of each of the groups (GR1, GR2, GR3, . . . ) may be determined in consideration of a worst-case among DVS pixels included in each group (GR1, GR2, GR3, . . . ). For example, in a readout time of the first group GR1, a first readout time may be allocated, in a readout time of the second group GR2, a second readout time may be allocated, and in a readout time of the third group GR3, a third readout may be allocated. The first readout time may be longer than the second readout time, and the second readout time may be longer than the third readout time.

Compared to the DVS system 4 of FIG. 7, since the DVS system 5 of FIG. 9 can allocate a more optimized readout time for each of a plurality of groups, a frame rate may further be increased.

Figure 11:
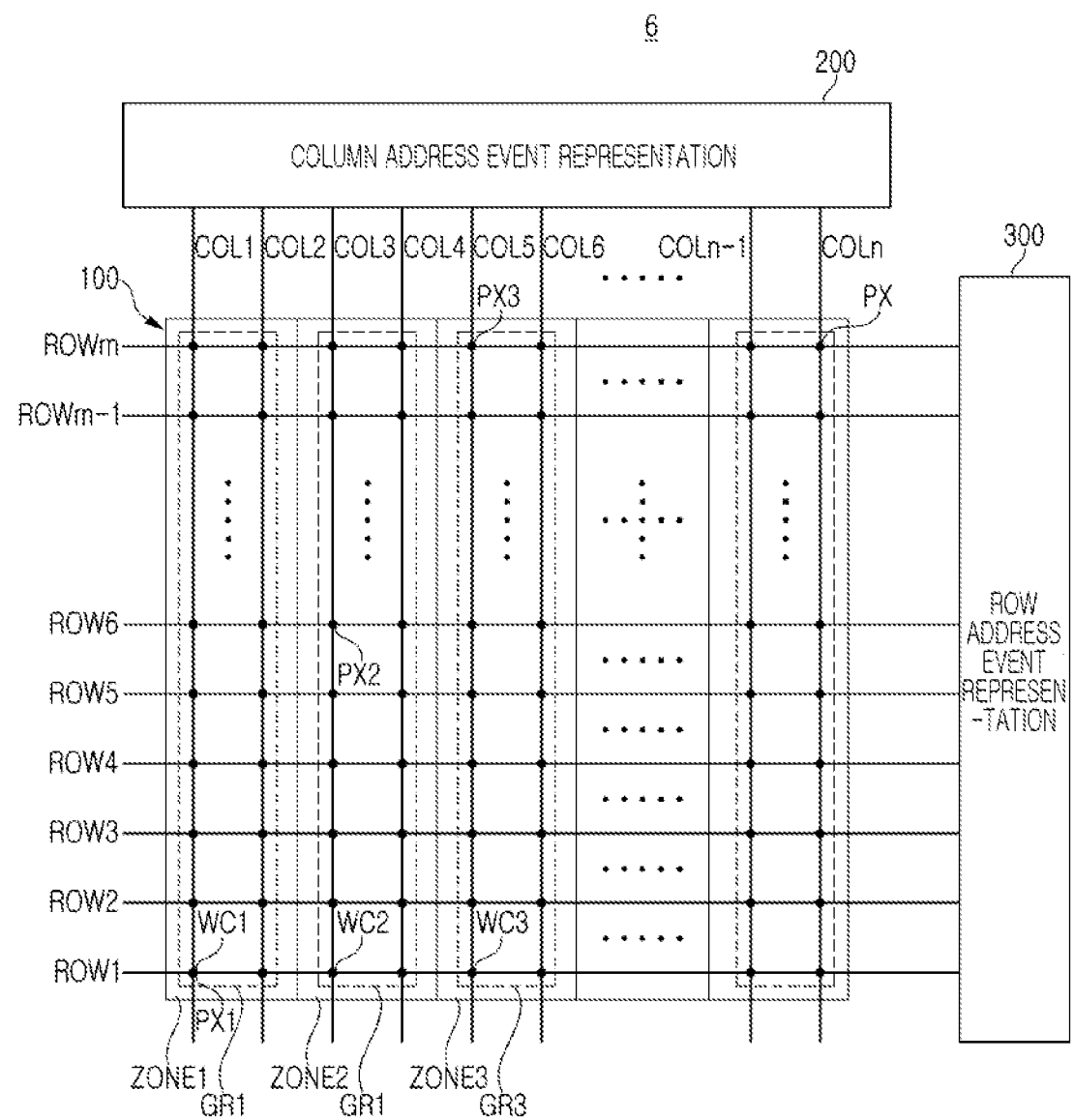
FIGS. 11 and 12 are diagrams provided to explain a readout operation of a DVS system according to an example embodiment of the present inventive concept.
Figure 12:
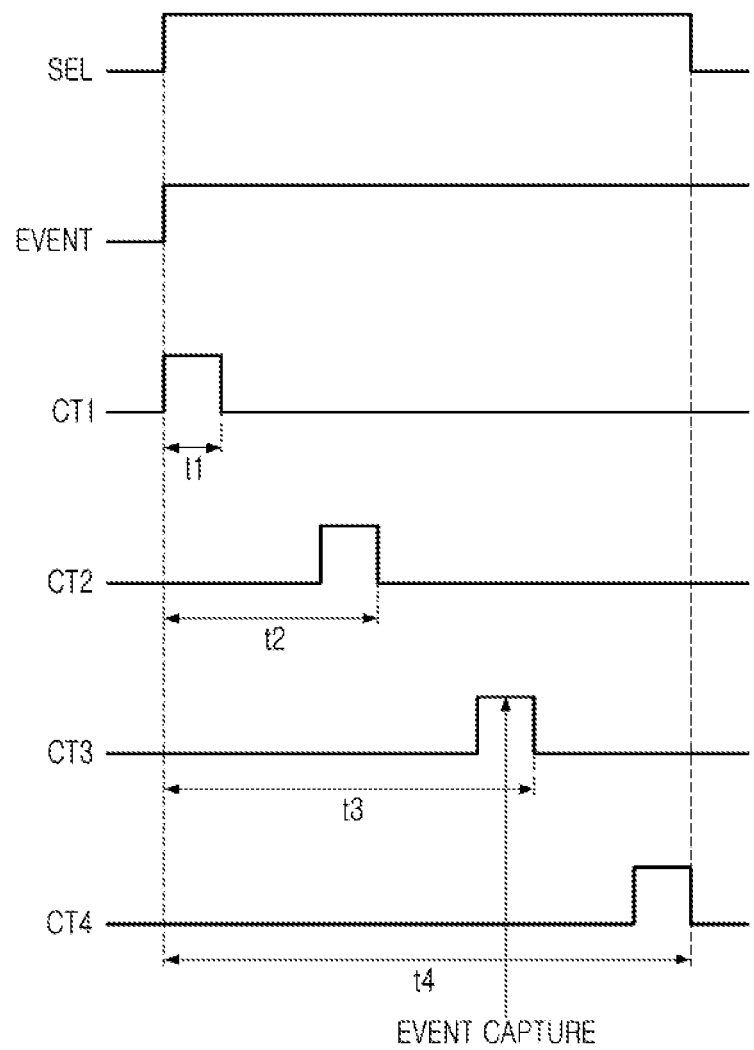

FIGS. 11 and 12 are views provided to explain a readout operation of a DVS system according to an example embodiment of the present inventive concept.

Referring to FIGS. 11 and 12, a DVS system 6 may divide a plurality of DVS pixels PX included in a pixel array 100 into a plurality of groups. The DVS system 6 can automatically allocate a readout time to each of the plurality of groups.

In detail, a DAER 400 may control each of pixels WC1, WC2, and WC3 to output an on-event signal from the DVS pixels WC1, WC2, and WC3 included in the pixel array 100. For example, the DAER 400 may transmit an event control signal EVENT to each of the pixels WC1, WC2, and WC3 through a column AER 200 such that an on-event signal is output from the DVS pixels WC1, WC2, and WC3 included in the pixel array 100 during an entire frame period SEL.

A time required for the row AER 300 to obtain an event signal output from each of the DVS pixels WC1, WC2, and WC3 may be different for each of the DVS pixels WC1, WC2, and WC3 since a physical distance is different for each of the DVS pixels WC1, WC2, and WC3. Accordingly, the DAER 400 may check whether or not the row AER 300 obtains an event signal output from the DVS pixels WC1, WC2, and WC3 during a first time t1. The DAER 400 may check whether or not the AER 300 obtains an event signal output from the DVS pixels WC1, WC2, and WC3 for a second time t2 after a predetermined time elapses from an end of the first time t1. The DAER 400 may check whether or not the AER 300 obtains an event signal output from the DVS pixels WC1, WC2, and WC3 for a third time t3 after a predetermined time elapses from an end of the second time t2. The DAER 400 may check whether or not the AER 300 obtains an event signal output from the DVS pixels WC1, WC2, and WC3 for a fourth time t4 after a predetermined time elapses from an end of the third time t3.

For example, when the DAER 400 determines that the AER 300 obtains the event signal output from the first DVS pixel WC1 for the first time t1, the DAER 400 may automatically allocate a readout time of a first group GR1 to which the first DVS pixel belongs to a sum of the first capture time t1 and an idle time. The first capture time t1 may mean a time taken for the row AER 300 to obtain an event signal of the first DVS pixel WC1, after the DAER 400 transmits the event control signal EVENT to the first DVS pixel WC1 through the column AER 200. The idle time may include a time taken for the first DVS pixel WC1 to be reset after the row AER 300 transmits a first reset signal to the first DVS pixel WC1 and a margin time.

When the DAER 400 determines that the row AER 300 obtains the event signal output from the second DVS pixel WC2 for the second time t2, the DAER 400 may automatically allocate a readout time of a second group GR2 to which the second DVS pixel belongs to a sum of the second capture time t2 and an idle time. The second capture time t2 may mean a time taken for the row AER 300 to obtain an event signal of the second DVS pixel WC2, after the DAER 400 transmits the event control signal EVENT to the second DVS pixel WC2 through the column AER 200. The idle time may include a time taken for the second DVS pixel WC2 to be reset after the row AER 300 transmits the first reset signal to the second DVS pixel WC2 and a margin time.

When the DAER 400 determines that the AER 300 obtains the event signal output from the third DVS pixel WC3 for the first time t3, the DAER 400 may automatically allocate a readout time of a third group GR3 to which the third DVS pixel belongs to a sum of the third capture time t1 and an idle time. The third capture time t3 may mean a time taken for the row AER 300 to obtain an event signal of the third DVS pixel WC3, after the DAER 400 transmits the event control signal EVENT to the third DVS pixel WC3 through the column AER 200. The idle time may include a time taken for the third DVS pixel WC3 to be reset after the row AER 300 transmits the first reset signal to the third DVS pixel WC3 and a margin time.

The margin time may include a time taken for the row AER 300 to be reset after the row AER 300 transmits the event signal to the DAER 400.

According to an example embodiment of the present inventive concept, a user may not allocate different readout times for each of a plurality of groups, and a DVS system 6 may automatically allocate an optimized readout time to each of the plurality of groups. Therefore, more optimized readout time can be allocated to each of the groups, thereby further increasing a frame rate.

As set forth above, according to an example embodiment of the present inventive concept, the DVS pixels may be grouped in consideration of the position of the DVS pixels, and an optimized readout time may be allocated to each of the groups. Therefore, a frame rate can be increased.

Various effects of the present inventive concept are not limited to the above description. The effects will be more readily understood in the process of describing the example embodiments of the present inventive concept. While example embodiments have been shown and described above, it will be apparent to those skilled in the art that modifications and variations could be made without departing from the scope of the present disclosure, as defined by the appended claims.

What is claimed is:

1. A dynamic vision sensor (DVS) system, comprising:
   a pixel array having a plurality of DVS pixels connected to a plurality of row lines and a plurality of column lines, wherein each of the DVS pixels is configured to output an event signal in response to a change in light;
   one or more address event representations configured to select one of the column lines, and to obtain the event signal output from a subset of the DVS pixels connected to the selected column line; and
   a control logic configured to generate image data using the event signals output from the DVS pixels,
   wherein the control logic is further configured to divide the DVS pixels into a plurality of groups, and to allocate a different readout time to each of the groups.

2. The DVS system of claim 1, wherein the control logic is configured to determine the readout time allocated to each of the groups based on a distance between at least one of the DVS pixels in each of the groups and further based on the address event representations.

3. The DVS system of claim 1, wherein the address event representations comprise:
   a column address event representation configured to determine at least one of the column lines as a selection column line in response to a first selection signal generated by the control logic, and to transmit the first selection signal to selection DVS pixels connected to the selection column line; and
   a row address event representation configured to be connected to the plurality of row lines in response to a second selection signal generated by the control logic, and to obtain the event signal from the selection DVS pixels.

4. The DVS system of claim 3, wherein the selection DVS pixels are turned on in response to the first selection signal, and output the event signal to the row address event representation, and
   a readout time of a group including the selection DVS pixels is determined based on a time for the selection DVS pixels to be turned on after the first selection signal is transmitted to the selection DVS pixels.

5. The DVS system of claim 3, wherein the row address event representation is configured to receive the event signal, and to output a first reset signal to the selection DVS pixels,
   wherein the selection DVS pixels are reset in response to the first reset signal, and
   wherein a readout time of a group including the selection DVS pixels is determined based on a time for the selection DVS pixels to be reset after transmitting the event signal to the row address event representation.

6. The DVS system of claim 5, wherein the row address event representation is configured to transmit the event signal to the control logic, the control logic is configured to transmit a second reset signal to the row address event representation, and the row address event representation is reset in response to the second reset signal, and wherein the readout time further comprises a margin time for the row address event representation to be reset after the row address event representation transmits the event signal to the control logic.

7. The DVS system of claim 6, wherein the margin time is the same for each of the plurality of groups.

8. The DVS system of claim 1, wherein DVS pixels connected to a same column line are divided into a same group.

9. The DVS system of claim 1, wherein different portions of the DVS pixels connected to a same column line are divided into different groups.

10. A dynamic vision sensor (DVS) system, comprising:
a pixel array including a plurality of DVS pixels connected to a plurality of row lines and a plurality of column lines, wherein each of the DVS pixels is configured to output an event signal in response to a change in light;
one or more address event representations configured to determine one of the column lines as a selection column line, and to obtain the event signal output from selection DVS pixels connected to the selection column line; and
a control logic configured to control the address event representations, and to receive the event signal from the address event representations,
wherein the control logic determines a readout time of the selection DVS pixels based on a time for the address event representations to obtain the event signal.

11. The DVS system of claim 10, wherein the control logic is configured to output an event control signal through the address event representations to the selection DVS pixels such that the event signal is output from the selection DVS pixels, and
wherein the one or more address event representations comprise:
a column address event representation configured to receive the event control signal from the control logic, and to transmit the event control signal to the selection DVS pixels; and
a row address event representation configured to receive the event signal from the selection DVS pixels.

12. The DVS system of claim 11, wherein the readout time is determined based on a time required for the row address event representation to obtain the event signal of the selection DVS pixels after the control logic transmits the event control signal to the selection DVS pixels through the column address event representation.

13. The DVS system of claim 12, wherein the row address event representation is configured to receive the event signal, and to output a reset signal to the selection DVS pixels, and the selection DVS pixels are reset in response to the reset signal, and wherein the readout time further comprises a time for the selection DVS pixels to be reset after the row address event representation outputs a reset signal to the selection DVS pixels.

14. A dynamic vision sensor (DVS) system, comprising:
a pixel array including DVS pixels connected to a plurality of row lines and a plurality of column lines, wherein each of the DVS pixels is configured to output an event signal in response to a change in light, and wherein the DVS pixels are divided into a first group and a second group;
one or more address event representations configured to select one of the column lines, and to obtain the event signal output from DVS pixels connected to the selected column line; and
a control logic configured to control the address event representations, and to determine an event corresponding to the event signal using the event signal,
wherein a first readout time of the first group is determined according to a position of the first group in the pixel array, and a second readout time of the second group is determined according to a position of the second group in the pixel array, the first readout time and the second readout time being different from each other.

15. The DVS system of claim 14, wherein when a first distance between the first group and the address event representations is greater than a second distance between the second group and the address event representations, and the first readout time is longer than the second readout time.

16. The DVS system of claim 14, wherein the first readout time corresponds to a readout time of a first representative pixel which is farthest from the address event representations among the DVS pixels in the first group, and
the second readout time corresponds to a readout time of a second representative pixel which is farthest from the address event representations among the DVS pixels in the second group.

17. The DVS system of claim 14, wherein the first readout time comprises a first time required for the DVS pixels in the first group to be turned on after the control logic transmits a selection signal to the DVS pixels in the first group through the address event representations to select one of the plurality of column lines, and
a second time required for the DVS pixels in the first group to output and reset the event signal.

18. The DVS system of claim 17, wherein the second readout time comprises a first time required for the DVS pixels in the second group to be turned on after the control logic transmits a selection signal to the DVS pixels in the second group through the address event representations to select one of the plurality of column lines, and
a second time required for the DVS pixels in the second group to output and reset the event signal.

19. The DVS system of claim 17, wherein the first time of the first group and the first time of the second group are different from each other.

20. The DVS system of claim 17, wherein the second time of the first group and the second time of the second group are different from each other.

* * * * *